S. M. Sherman,
Horse Rake.

No. 49164          Patented Aug. 1. 1865.

Witnesses:

Inventor.
S. M. Sherman

UNITED STATES PATENT OFFICE.

S. M. SHERMAN, OF FORT DODGE, IOWA.

IMPROVEMENT IN HORSE-RAKES.

Specification forming part of Letters Patent No. 49,164, dated August 1, 1865.

*To all whom it may concern:*

Be it known that I, S. M. SHERMAN, of Fort Dodge, in the county of Webster and State of Iowa, have invented a new and Improved Horse-Rake; and I do hereby declare that the following is a full, clear, and exact description thereof, which will enable others skilled in the art to make and use the same, reference being had to the accompanying drawings, forming part of this specification, in which—

Figure 1:
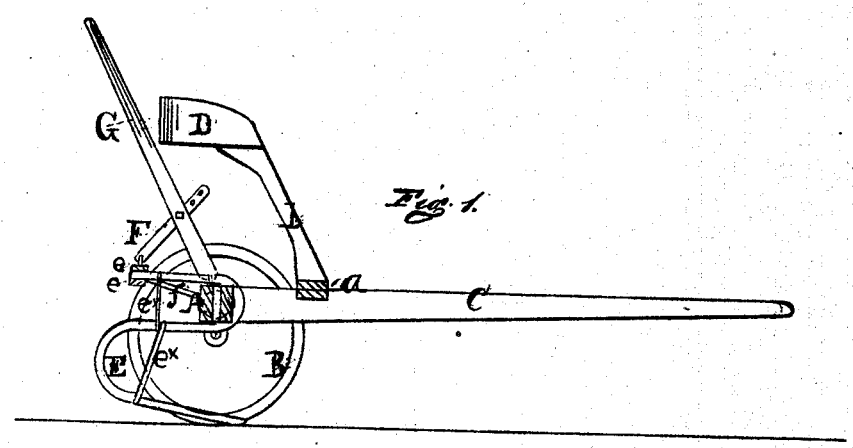
Figure 2:
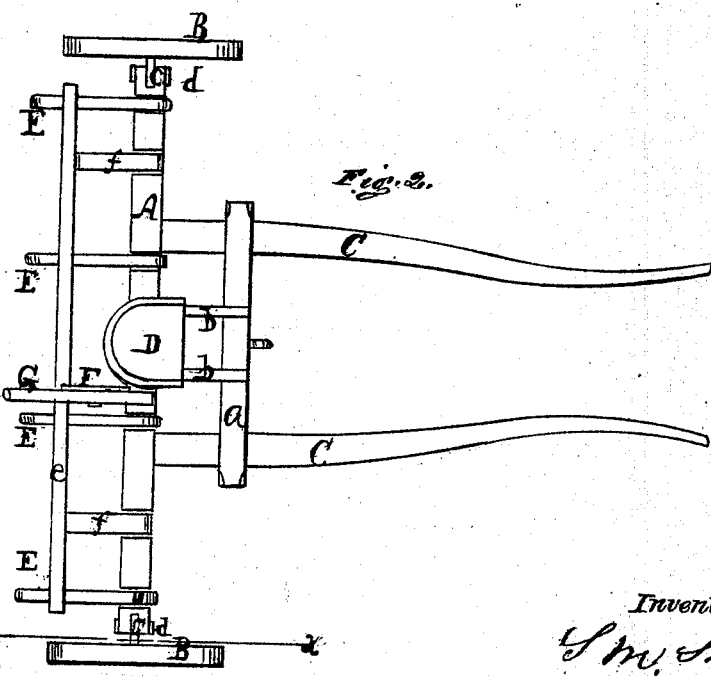

Figure 1 is a side sectional view of my invention, taken in the line $x$ $x$, Fig. 2. Fig. 2 is a plan or top view of the same.

Similar letters of reference indicate like parts.

This invention consists in constructing the teeth of the rake of wood bent or curved in S form, and arranged or applied in such a manner as to form a cheap and durable horse-rake, one which will operate perfectly and be capable of being manipulated with the greatest facility.

A represents an axle, having a wheel, B, on each end of it, and thills C C attached to it, connected by a cross-bar, $a$, to which standards $b$ are secured, which support the driver's seat D, the latter being above and about in line with the axle A. The wheels B B are not attached directly to the axle A, but to plates $c$, which are fitted in the ends of the axle, and the latter may be adjusted higher or lower by means of pins or bolts $d$, which pass transversely through the axle and through any one of a series of holes in the plates $c$. The axle A has a number of cylindrical portions formed on it, at equal and suitable distances apart, corresponding to the number of teeth to be used.

The teeth represented by E are constructed of wood and bent in S form, as shown clearly in Fig. 1, the upper bend of the teeth being fitted on cylindrical portions of the axle, so that they may turn freely thereon. The upper and rear ends of the teeth E are attached to or secured between bars $e$ $e$, which are secured to arms $ff$, fitted loosely on axle A, and these bars are connected by a link, F, with a lever, G, the lower end of which is connected by a joint with the axle A. By actuating this lever G the rake-teeth may be raised or lowered, as circumstances may require, either to discharge the load or pass over obstructions, said lever being within convenient reach of the driver on seat D.

The teeth may be preserved in proper form by straps $e^x$; and it will be seen by referring to Fig. 1 that the form of the teeth will admit of their having a certain degree of elasticity, sufficient to enable them to yield or give to obstructions of any kind which may be in their path, and at the same time keep them in contact with the earth, so that they can properly perform their work.

The teeth may be adjusted higher or lower, as may be required, by adjusting the axle A, as previously described.

The whole arrangement is extremely simple and efficient, may be constructed at a moderate cost, and manipulated or managed by the driver with the greatest facility.

Having thus described my invention, I claim as new and desire to secure by Letters Patent—

The combination of the S-formed wooden teeth E, bars $e$ $e$, arms $ff$, link F, and lever G, all as specified.

S. M. SHERMAN.

Witnesses:
 GEO. W. BASSETT,
 THEO. HAWLEY.